UNITED STATES PATENT OFFICE.

CONRAD RICHARD BÖHM, OF BERLIN, GERMANY, ASSIGNOR TO CEROFIRM-GESELLSCHAFT M. B. H., OF BERLIN, GERMANY.

METHOD OF PRODUCING INCANDESCENT MANTLES.

973,253.     Specification of Letters Patent.     Patented Oct. 18, 1910.

No Drawing.     Application filed February 8, 1908. Serial No. 414,914.

*To all whom it may concern:*

Be it known that I, CONRAD RICHARD BÖHM, a citizen of the Empire of Germany, residing at Berlin, in the Empire of Germany, have invented a new and useful Method of Producing Incandescent Mantles, of which the following is a specification.

My invention relates to improvements in known methods of preparing tubes made from artificial silk, for producing incandescent mantles possessing not only a high degree of strength and durability, but also a uniform illuminating power, so that the manufacture of these incandescent mantles on a large scale is rendered easy and possible.

For some years past endeavors have been made to use tubes made from fabric of artificial silk for the production of incandescent mantles, since the artificial silk presents certain advantages over cotton, ramie, etc., (see for instance *Journal für Gasbeleuchtung und Wasserversorgung*, 1897, volume 40, page 343; 1902, volume 45, page 32; 1903, volume 46, page 11; and 1906, volume 49, page 765). However, the artificial silk, owing to its peculiar nature, presents at the same time considerable difficulties, which require to be overcome.

It has been proposed to soak the tubes impregnated with solutions of nitrate of thorium and cerium in an alkaline liquid, for instance ammonia, so as to turn the nitrates of the rare earths into hydroxids, but this method is objectionable for the following reasons: The tubes so prepared and containing hydroxids will, after they have been dried, burnt, and calcined, be turned into ashy skeletons of comparatively granular and hard oxids, which skeletons are certainly durable and not sensitive, but present the defect, that they consume considerably more gas than the ordinary incandescent mantles. Others have substituted for the alkaline liquid a solution of peroxid of hydrogen, whereby incandescent mantles can be produced which are very soft, elastic and durable in the highest degree. However, it is extremely difficult to produce by this method mantles of a uniform lighting power and this for the reason, that the hydrogen peroxid can turn only the nitrate of thorium into a combination insoluble in water, viz. peroxid of thorium, which remains in the tube, while the nitrate of cerium is not altered at all, so that it is extracted from the tube during the treatment. It is true, that this drawback can be somewhat reduced in the manner, that the percentage of the nitrate of cerium is increased, say from 1% to 5%, and is added to a more concentrated solution of hydrogen peroxid, or that an empirical excess of cerium is added to the concentrated solution of hydrogen peroxid, which solution in both cases contains from 8 to 10% instead of 3% of hydrogen peroxid. Then there will be a surplus of nitrate of cerium in the tube, which surplus is more or less removed during the treatment, so that the percentage of the cerium in proportion to the thorium in the finished mantle may be nearly correct. However, it is obvious, that the quantity of cerium contained in the bath of hydrogen peroxid will necessarily vary constantly. As the color of the light and the illuminating power of the incandescent mantle depend upon the percentage of the cerium in proportion to that of the thorium, it is evident, that it is not possible to produce by this method on a large scale incandescent mantles of the same illuminating power and color of light, as the latter will be influenced by the least variation in the percentage of cerium.

My invention relates to an improvement in the last named method, whereby the said serious drawback is avoided.

The improvement consists in using in addition to the peroxid of hydrogen one of such substances, which in conjunction with the peroxid of hydrogen render the resulting cerium combination insoluble in water without in the least impeding the formation of an insoluble thorium combination under the action of the peroxid of hydrogen. The mixture of hydrogen peroxid and any of the said substances therefore produces a simultaneous and uniform separation and deposition of thorium and cerium in the tube. Thereby a constant proportion between the thorium and the cerium in the finished mantle is guaranteed, and the so improved method permits it to manufacture on a large scale mantles, which possess a uniform illuminating power and produce a light of the same color.

Such substances as mentioned above are various organic acids and their salts. I will name a few of them: Acetates in the presence of peroxid of hydrogen can separate cerium in a form which is insoluble in water, see *Journ. Chem. Soc.*, 1882, volume 41, I, pages 203 and 204; and also my work "*Die Darstellung der Seltenen Erden*." Leipsic, 1905, volume 1, pages 91 and 155. In the above cited *Journ. Chem. Soc.*, 1882, it is stated, that a solution of ammonic acetate and a little hydrogen peroxid is added to the solution to be examined for separating the cerium from the other rare earths. I have discovered, that the acetates when added to the peroxid of hydrogen do not hinder the precipitation of the thorium combination. A solution of 3% of hydrogen peroxid and of from 6% to 10% of any acetate is capable of precipitating both the thorium combination and the cerium combination at the same time. I therefore pass the tubes impregnated with solutions of thorium and cerium through a bath of 3% of peroxid of hydrogen to which from 6% to 10% of any acetate is added, for producing by drying, burning off, and calcining, as usual, the incandescent mantles possessing a uniform illuminating power and color of light. It is to be remarked, however, that in this method free acids must be avoided as much as possible, so as to insure the desired effect. Lactic acid added to the bath of peroxid of hydrogen will also produce, together with the latter, combinations of cerium, thorium, and other rare earth metals which are insoluble in water. From 6% to 10% of lactic acid or any of its salts should be added to the solution of 3% of hydrogen peroxid for producing the said effect. I therefore may use the lactic acid or any of its salts in place of the acetate for the production of incandescent mantles of a similar excellent kind. In this case also as before free acids must be avoided as much as possible.

Formic acid, malic acid, and other similar acids show a similar behavior to the acetate and the lactic acid, if from 5% to 10% of any of them is added to the solution of 3% of hydrogen peroxid, but the formic acid and the malic acid are capable of precipitating the rare earths from weak acids only, such as for example acetic acid. Any of the salts formed of formic acid, or malic acid, etc., and any suitable base can precipitate the rare earths from any acid. In this case I recommend to more or less neutralize the free acid in proportion to the organic acid used. The bases used for forming the said salts should be so chosen, that the salts produced are capable of being easily removed from the tube of fabric, be it by washing, or in a subsequent stage of the process during the burning off or calcination by evaporation or disintegration. For bases I prefer ammonia combinations, in so far as they do not disturb the reaction.

The method of producing the incandescent mantles from tubes of artificial silk may otherwise be as usual, say as follows: The tubes of fabric are first impregnated with solutions of nitrates or other salts of thorium and cerium as usual, then dried, next impregnated with hydrogen peroxid to which a substance of the kind described above has been added, thereupon washed, if necessary, dried, burnt and calcined. The impregnation of the tubes with hydrogen peroxid and the substance mentioned may be effected by passing the tubes several times through a bath containing a solution of 3% of hydrogen peroxid to which from 6% to 10% of acetate of ammonium or a similar acetate or of lactic acid or of any of its salts, or from 5% to 10% of formic acid, or malic acid or other similar acid, or of any of their salts are added, the bath being heated up to from 25° to 35° centigrade.

In former methods only a solution of peroxid of hydrogen is employed for the bath, through which the tubes are passed. As the peroxid of hydrogen can turn only the nitrate of thorium into a combination insoluble in water, it follows, that of the nitrates of the two rare earth metals contained in the tubes that of the cerium remains unaltered and can be extracted from the tube during the treatment, so that the quantity of cerium contained in the tube will vary and consequently it is impossible to produce on a large scale incandescent mantles of a uniform quality, as already mentioned above. By my new method, however, where for the bath the solution of a mixture of hydrogen peroxid and any of the mentioned substances is employed, the important effect is obtained, that the simultaneous precipitation of both the thorium combination and the cerium combination is rendered possible, which two combinations are therefore deposited in the tube and can not be extracted therefrom during the treatment or by subsequent washing, so that the proportion between the thorium and the cerium will remain constant for all of the finished mantles. This is the more important, as it is possible to adopt the most advantageous proportion, viz. 1 part by weight of cerium and 100 parts by weight of thorium.

I claim:

1. The method of producing incandescent mantles, which consists in impregnating the tubes of fabric with solutions of salts of thorium and cerium, then drying them, next passing them several times through a bath consisting of a solution of hydrogen peroxid and of a substance containing the radical of an organic acid, whereby the salts of thorium and cerium are simultaneously and independently turned into combinations of thorium and cerium both insoluble in water, thereupon drying, burning, and calcining them.

2. The method of producing incandescent mantles, which consists in impregnating the tubes made from fabric of artificial silk with solutions of salts of thorium and cerium, then drying them, next passing them several times through a bath consisting of a solution of hydrogen peroxid and of a substance containing the radical of an organic acid, whereby the salts of thorium and cerium are simultaneously and independently turned into combinations of thorium and cerium both insoluble in water, thereupon drying, burning, and calcining them.

3. The method of producing incandescent mantles, which consists in impregnating the tubes of fabric with solutions of salts of thorium and cerium, then drying them, next passing them several times through a bath consisting of a solution of hydrogen peroxid and of a substance containing the radical of an organic acid, whereby the salts of thorium and cerium are simultaneously and independently turned into combinations of thorium and cerium both insoluble in water, thereupon washing, drying, burning, and calcining them.

4. The method of producing incandescent mantles, which consists in impregnating the tubes made from fabric of artificial silk with solutions of salts of thorium and cerium, then drying them, next passing them several times through a bath consisting of a solution of hydrogen peroxid and of a substance containing the radical of an organic acid, whereby the salts of thorium and cerium are simultaneously and independently turned into combination of thorium and cerium both insoluble in water, thereupon washing, drying, burning, and calcining them.

CONRAD RICHARD BÖHM.

Witnesses:
HENRY HASPER,
WOLDEMAR HAUPT.